United States Patent [19]

Sklar et al.

[11] Patent Number: 5,601,711
[45] Date of Patent: Feb. 11, 1997

[54] SELECTIVE SEPARATION FILTER DEVICE

[75] Inventors: Eric Sklar, Northville; Peter L. Graham, Pinckney; Jane Larson, Ann Arbor, all of Mich.

[73] Assignee: Gelman Sciences Inc., Ann Arbor, Mich.

[21] Appl. No.: 331,974

[22] Filed: Oct. 31, 1994

[51] Int. Cl.$^6$ .............. B01D 27/00; B01D 21/26
[52] U.S. Cl. .......... 210/238; 210/232; 210/323.2; 210/335; 210/360.1; 210/513; 210/520; 422/72; 422/101
[58] Field of Search ............... 210/323.2, 232, 210/324, 335, 359, 520, 515, 516, 519, 238; 422/72, 101, 32

[56] References Cited

U.S. PATENT DOCUMENTS

| | | | |
|---|---|---|---|
| 4,228,012 | 10/1990 | Pall | 210/238 |
| 4,522,713 | 6/1985 | Nussbaumer et al. | 210/136 |
| 4,632,761 | 12/1986 | Bowers et al. | 210/650 |
| 4,636,361 | 1/1987 | Marian et al. | 422/101 |
| 4,755,301 | 7/1988 | Bowers et al. | 210/650 |
| 4,824,560 | 4/1989 | Alspector | 209/208 |
| 5,124,041 | 6/1992 | Sheer et al. | 210/641 |
| 5,171,533 | 12/1992 | Fine et al. | 210/518 |

*Primary Examiner*—David A. Reifsnyder
*Attorney, Agent, or Firm*—Gifford, Krass, Groh, Sprinkle, Patmore, Anderson & Citkowski, P.C.

[57] ABSTRACT

A filter device or apparatus is provided for the separation of materials, especially biomaterials from a fluid sample, under a force such as centrifugation, positive pressure, vacuum, or gravity. The device comprises two or more in-line tubular elements, one or more of which is a module that houses a filter media. The elements have complementary connection structures (e.g., elastomeric seal, O-ring, threads, Luer fittings, compression fittings, bayonet fittings, snap fittings, and the like) such that they can be assembled or reassembled in a train to form a conduit structure for leak-proof passage of a fluid sample volume. The assembly can be disassembled for collection and processing of retentate and filtrate material resulting from the filtration.

9 Claims, 8 Drawing Sheets

SELECTIVE SEPARATION FILTER DEVICE

FIELD OF THE INVENTION

This invention concerns filter apparatus for selective separation of materials, especially fluid materials such as biological materials or biomolecules from a fluid sample, under a force such as centrifugation, positive pressure, vacuum, or gravity.

BACKGROUND OF THE INVENTION

Filter apparatus are known for selectively separating and binding biomolecules contained in a solution; see, for example, U.S. Pat. No. 5,124,041. In a preferred method, a binding support membrane in contact with a cut-off filter membrane is used for binding the biomolecules such that the solution will pass through the binding support before passing through the cut-off membrane. However, the media layers are loose and not mounted in a support structure with the results that their handling is more difficult than if they were each mounted in a separate support. The device also lacks the capacity in operation to clean the sample in-line prior to the binding layer.

Dead end filters, commonly available from many sources, are cylindrical housings with filter media permanently sealed at the bottom. The housing fits into the top of a centrifuge tube, and the fluid sample is placed in the housing and spun through the filter into the tube. These devices have the disadvantage that only the filtrate is easily recoverable (not the retentate) and they have only one filtration layer.

Reverse flow devices are centrifugation devices in which the flow of filtrate is counter to the direction of the centrifuge force. See, for example, U.S. Pat. No. 4,522,713. They typically consist of a plunger inside a centrifuge tube. The plunger has filter media sealed on its bottom face. In use, a fluid sample and then the plunger are placed in the centrifuge tube. With the plunger in place, the level of the fluid around the plunger is higher than the level within it. Under the force of centrifugation, the fluid seeks to equalize the level forcing some through the filter. These devices have disadvantages in that they do not completely filter a sample (some unfiltered fluid remains outside the plunger), they are usually single layer devices, and they cannot clean the sample prior to separation.

BRIEF DESCRIPTION OF THE INVENTION

The invention comprises a filter apparatus for selective separation of materials, such as biomaterials, from a fluid sample under a force such as centrifugation, positive pressure, vacuum, or gravity. The apparatus comprises two or more tubular elements that can be assembled together as a train of elements in axial alignment. The assembly forms a leak-proof conduit for the passage of the fluid sample. The elements comprise a) one or more modules, each such module housing a filter media and having open ends and b) a sample reservoir to hold the sample volume and having open ends. The periphery of the open ends of the elements is configured as connection structures such that they can be assembled and disassembled to form the leak-proof conduit. Such connection structures may include, for example, elastomeric seal (e.g., O-ring), threads, Luer fittings, compression fittings, bayonet fittings, snap fittings, or other suitable connection. Each media housing has one or more layers of filter media mounted by a peripheral seal in the interior of the module in such a way that fluid can pass through (without fluid bypass) from one open end of the module to the other open end only by passing through the respective media layers. Examples of commonly known manufacturing processes that may be used to achieve this seal include thermal staking, ultrasonic staking, adhesives, mechanical pinch, insert molding, or any other seal-forming means.

The invention comprises a family of interchangeable modules. Sealed into each module is one or more layers of filter media. Examples of commercially available filter media include screens, depth filters, microporous membranes, ultrafiltration membranes (also called cut-off membranes or molecular weight cut-off membranes), and binding media. Binding media such as protein binding membranes typically have pore size in the microporous range but have some affinity for proteins (such as electrostatic, ionic, chemical, ligand-receptor, or hydrophobic). With a relatively small set of modules housing different media, a large number of configurations can be assembled by the manufacturer or by the end user to suit a wide range of applications. Examples of several configurations are included in the following description of the preferred embodiments and in the exemplary protocols.

The end user may also disassemble the apparatus. This feature allows the user to recover either the material that is retained on the media (retentate) or the fluid that has passed through the media (filtrate) from each module. The modular nature of the apparatus also allows the modules to be reversed, either directly or by the use of adapter elements. Reversing a module after an initial filtration step and reapplying the driving force to the system allows the user to remove and recover retentate from the module. Traditional methods such as pipetting, rinsing, etc., may be used alternatively to recover retentate.

BRIEF DESCRIPTION OF THE DRAWINGS

The features and advantages of the filter apparatus according to the invention will be seen by reference to the following detailed description in connection with the accompanying drawings in which.

DETAILED DESCRIPTION OF THE INVENTION

The invention concerns an apparatus of the kind described for selective separation of biomaterials from a fluid sample.

In a preferred embodiment, the invention comprises a train of open-end tubular elements that are connectable together end-to-end in axial alignment to form a unitary conduit structure defining a flow path for leak-proof passage of the fluid sample through the conduit. The elements comprise one or more filter media modules and a sample reservoir. Each media module has an inlet, an outlet, and houses one or more layers of filter media. The diameter of each module is such that it fits, with small clearance, inside a standard centrifuge tube. The inlet and outlet of each module are configured as connection structures. The connection structures are means by which the modules can be attached to and detached from other modules, the sample reservoir, or other auxiliary elements. The connection structures allow the elements to be connected together in a train to allow leak-proof passage of a fluid sample through the filter media of the train. Examples of such connection structures include elastomeric seal (O-ring), threads, Luer lock and Luer slip fittings, compression fittings, snap fittings, bayonet fittings, and like fittings. The media housed in each module may be one or more layers of screen or depth filter, microporous filter, affinity binding filter, or ultrafiltration filter. The sample reservoir has an inlet, a body portion, and an outlet. The outlet and body portion of the sample reservoir fit, with small clearance, into the interior of a standard centrifuge tube. The outlet of the sample reservoir is configured as a connection structure, defined above. The inlet is configured with a flange that is sized such that the flange rests on the lip on the open end of the centrifuge tube when the sample reservoir is inserted into the centrifuge tube. To prevent vacuum or pressure build-up, the flange may include a groove or gap to permit air to pass from the bottom of the centrifuge tube, through the small clearance area between the tube and the elements, through the gap or groove, and into the body of the sample reservoir. In use,, the elements are assembled and inserted into a centrifuge tube, the sample reservoir is filled, the tube is capped and placed into a centrifuge, and the tube is spun. The force of centrifugation drives the fluid sample through the media layers, where some portion of the sample is retained. The desired product of the filtration process may be the retentate on the media layers, the filtrate, or both.

In another preferred embodiment, the invention additionally comprises a recovery cup and, optionally, a reversing adapter. The recovery cup has an open end, configured as a connection structure such that it can be attached to the inlet of a filter media module, and a closed end. Fluid passes in through the open end and is retained in the body of the cup. The reversing adapter has two open ends, configured as connection structures such that one end can be attached to the outlet of a filter media module and the other attached to the outlet of the sample reservoir, resulting in the module being assembled in the train in a reversed position. This is an optional element because some connection structures allow the direct connection of the sample reservoir outlet to the filter media module outlet (e.g., a bayonet fitting). The additional element or elements assist in recovery of the retentate from a filter media module after initial filtration by allowing the module to be reversed from its original orientation and the driving force reapplied, driving the retentate from the module into the recovery cup.

Additional embodiments of the invention are described below that use forces other than centrifugation to drive the filtration. The elements in these embodiments are similar to those described above, except as noted. These alternate embodiments are, of course, not dimensionally limited to fit in a centrifuge tube.

In another preferred embodiment, the filling open end of the sample reservoir is configured for attachment to a positive pressure source, such as a syringe or pump. In this case the positive pressure provides the driving force of filtration. This embodiment may optionally include an outlet element, for connection to downstream tubing or devices, and a reversing adapter element as described above.

In another preferred embodiment, the elements comprise one or more filter media modules, sample reservoir and an outlet element. The outlet element has one open end configured for attachment to a vacuum source, such as a vacuum pump or a syringe. The other open end of the outlet is configured with a connection structure, defined above, for connection to a filter media module.

Figure 7:
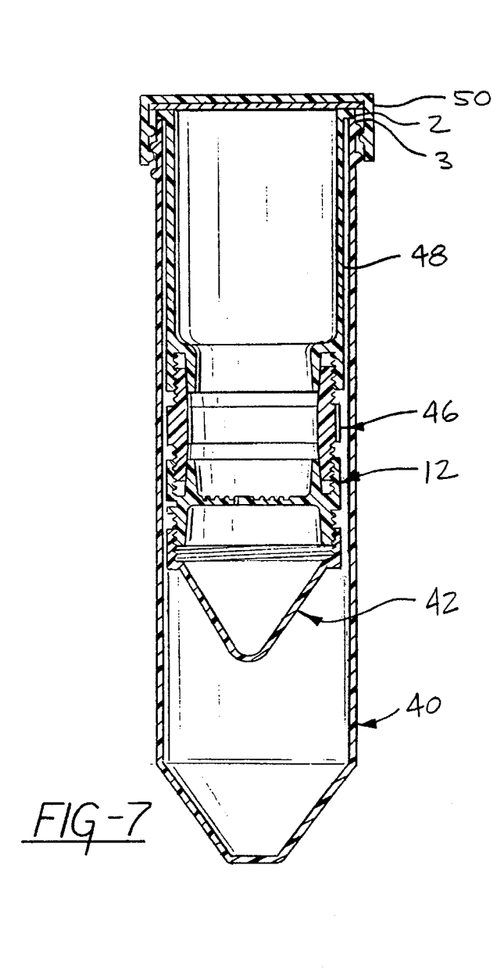
FIG. 7 is an elevational view in section of assembled elements with the filter media module in reversed orientation for recovery of retentate in a centrifuge tube configuration.

The invention in a further preferred aspect concerns a method for harvesting particulates from a fluid sample, e.g., a sample containing culture cells in nutrient media. The method comprises the steps of: filling the fluid sample into a sample reservoir connected together in a train of centrifugible tubular elements having complementary connection structures in unitary leak-proof conduit structure relation comprising a filter media module housing a macroporous filter media; centrifuging the fluid sample such that the sample is filtered and the cells are retained on the macroporous filter. In a preferred embodiment, the invention further comprises disassembling the filter media module bearing the retentate, connecting an inverted recovery cup to cover the retentate module; inverting the cup-module assembly and connecting the assembly to an adapter; connecting the adapter to a sample reservoir; optionally adding a small amount of fluid to the sample reservoir to assist in flushing the retentate off the media, inserting the resulting train of elements into a centrifuge tube; centrifuging the container after capping the tube (e.g., as the elements are shown in FIG. 7); and recovering the thus harvested cells. Alternatively, recovery of the particulates can be done by pipetting or rinsing the retentate from the filter media.

Still another preferred embodiment concerns a method for purification of biomaterials from a fluid sample. The method comprises the steps of: filling the fluid sample into a sample reservoir connected together in a train of centrifugible tubular elements having complementary connection structures in unitary leak-proof conduit structure relation comprising one or more filter media modules, each such module housing filter media, one element comprising a module housing an ultrafiltration filter media; inserting the train of elements into a centrifuge tube; centrifuging the fluid sample such that retentate is obtained on the ultrafiltration filter media; removing the train from the centrifuge tube; and recovering the retentate, preferably employing an adapter and a recovery cup each comprising complementary connection structures. Recovery of the retentate in a preferred embodiment comprises the steps of disassembling the module housing the retentate bearing ultrafiltration filter media; connecting the recovery cup to the retentate bearing module; inverting the cup-module assembly and connecting the assembly to an adapter; connecting the adapter to a sample reservoir; optionally adding a small amount of fluid into the sample reservoir to assist in flushing; inserting the resulting train of elements with added fluid into a centrifuge tube; centrifuging the container after capping the tube; and recovering the thus purified retentate. Alternatively, recovery can be done by pipetting or rinsing the retentate from the filter.

In a still further preferred embodiment, the invention comprises a method for selective binding of biomaterials from a fluid sample as described hereinbelow, comprising the steps of: filling the fluid sample into a train of centrifugible tubular elements connected together, one element comprising a module housing a protein binding filter media; inserting the train into a centrifuge tube; centrifuging the fluid sample such that the proteins of interest are bound to the filter media. Recovery of the retentate comprises the additional steps of filling the sample reservoir with a rinsing fluid and centrifuging it through the train to remove non-bound or weakly bound proteins from the filter media, placing the train in a clean centrifuge tube, filling the sample reservoir with an eluting solution (e.g., extreme ionic strength or pH), centrifuging the eluting solution through the media to release the proteins from their bound state.

This invention is illustrated by the following exemplary protocols for protein purification, cell harvesting, and protein binding:

PROTEIN PURIFICATION

1. Culture cells containing proteins of interest in a nutrient media are employed.

2. Physically or chemically lyse the cells (break the cell walls). This results in a mixture containing the proteins of interest, cell wall debris, other contents of the cells, and media.

3. Assemble a leak-proof filter train by connecting together (using uniformly connectable connection structures) one or more filter media modules (e.g., one containing a macroporous screen or depth media, one a microporous membrane, and one a molecular weight cut-off (MWCO) membrane) and a sample reservoir. Place the assembly into a 50 mL centrifuge tube.

4. Pour the item 2 mixture into the sample reservoir, cap, and insert the tube into a fixed angle rotor.

5. Centrifuge the mixture completely.

6. Remove the assembly from the centrifuge tube and disassemble the MWCO membrane module. The retained protein may be removed by pipetting, rinsing, or by using an invert-and-spin procedure. To perform the invert-and-spin procedure:

a. Connect a recovery cup to the membrane side of the MWCO module and invert the cup-module assembly. Connect an adapter to the module and the connect a sample reservoir to the adapter.

b. Replace the assembled train in the centrifuge tube. Place a small amount of rinse fluid into the reservoir and cap.

c. Spin very gently. This will rinse the proteins from the membrane into the cup.

d. Remove and disassemble.

CELL HARVESTING

The procedure is identical to that for protein purification except that cells are not lysed and only a single filter module (for a macroporous membrane) is used. The captured cells are recovered in a like manner using a pipette, rinsing the filter, or the invert and spin procedure.

PROTEIN BINDING

Binding membranes typically have pore size in the microporous range but have some affinity for proteins (such as electrostatic, ionic, chemical, ligand-receptor, or hydrophobic). The binding membranes selected for use in the present method will typically be those with a reversible binding interaction. The procedure for their use is identical to steps 1–5 of the purification protocol described above except a binding membrane is used in place of the ordinary microporous layer, and it is this layer that retains the proteins of interest. The recovery step involves an additional procedure to release the proteins from their bound state. The device in a preferred embodiment can also be used to remove a specific, undesired protein from a sample without the need to release the protein from the bound state.

The apparatus and method of the invention have many advantages. The method is flexible. The user can assemble a train of membranes customized to the requirements of each application. The components of the sample volume can be recovered readily. The user can recover the retentate from any layer by simply disassembling the specific filter module containing that layer from the assembly and using the invert-and-spin procedure with rinse fluid to remove the retentate from the module. The filtrate may also be recovered. The multilayer design allows the sample to be cleaned and separated in a single step, eliminating the time and equipment required for a pre-filter step. The device is unique in that it enables the user to select and combine macroporous, microporous, and molecular weight cut-off (MWCO) membranes in a single device.

DESCRIPTION OF THE PREFERRED EMBODIMENTS

Figures 1, 2, 3, 4:
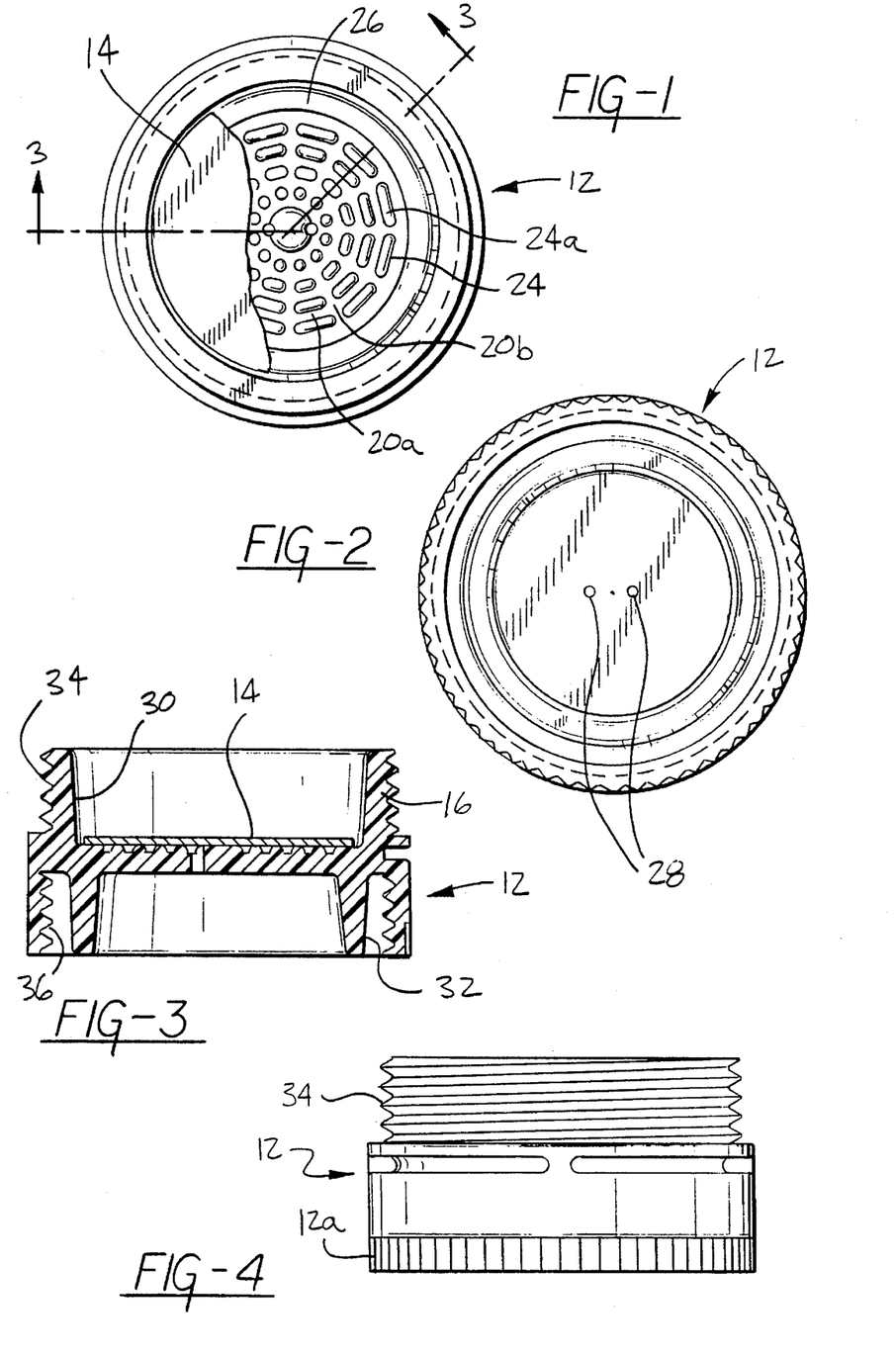
FIG. 1 is a top view of a filter media module comprising a circular filter media shown as a filter fragment.
FIG. 2 is a bottom view of a filter media module.
FIG. 3 is a side view in diametral section of a filter media module taken on line 3—3 of FIG. 1.
FIG. 4 is a side view of a filter media module.

Referring to the drawings, FIGS. 1–4 show different views of a preferred embodiment of a filter media module 12 according to the invention. As is seen in FIG. 3, the module is a shallow tube or conduit for axial passage of fluid through the filter media 14. The side wall 16 of the module forms an open chamber above the filter media 14. The filter media in turn is supported by a patterned grid 24 (FIG. 1) of upward protruding support bodies 24a separated by depressed annular and radial drain channels 20a, 20b leading to through passage channels 28 which provide drainage outlets for fluid sample filtrate passing through the filter media 14 and for reverse flow of rinse fluid for purposes of rinsing. The module 12f or complementary threaded connection comprises an external thread 34 and an internal thread 36. For fluid leak-proof sealing of adjacent thread connected module elements, a female sealing surface 30 and a male sealing surface 32 are provided in each module such that connection together of the adjacent modules serves to press these respective surfaces intimately and pervasively together in matching leak-proof relation. Threading can be reversed (i.e., to achieve unthreading) as desired to accommodate various purposes, as described herein. In one preferred embodiment shown in FIGS. 2 and 4, the periphery of one open end of the module 12 is formed with scalloped knurls 12a to facilitate threading and unthreading of the module by rotary finger pressure at that open end.

The filter media 14 sealed at its outer edge on the seal area 26 is supported and spaced by these bodies 24a above the drain channels 20a, 20b so that filtrate fluid can pass through the filter media and drain centrally along the drain channels and then enter and pass through the through passage channels 28 to a container in a centrifuge insert, manifold or syringe insert configuration. Also, these elements advantageously provide for reverse fluid flow, e.g., rinse fluid, through the channels 28, 20a, 20b and through the filter media 14 for purposes of rinsing or retentate recovery in a centrifuge insert, manifold or syringe configuration.

Figure 5:
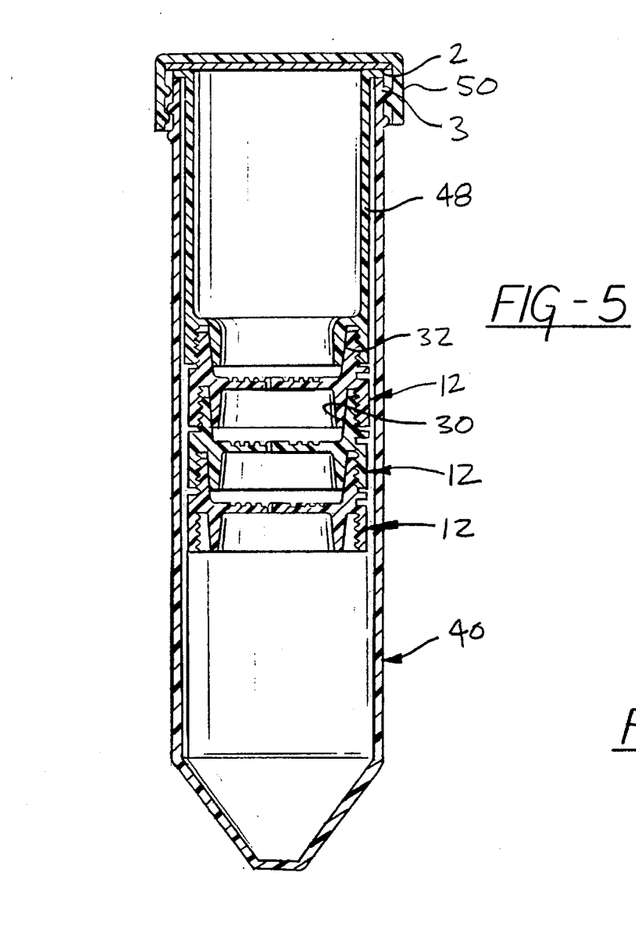
FIG. 5 is an elevational view in section of assembled elements of a filter apparatus for selective separation of materials in a centrifuge tube configuration.
Figure 6:
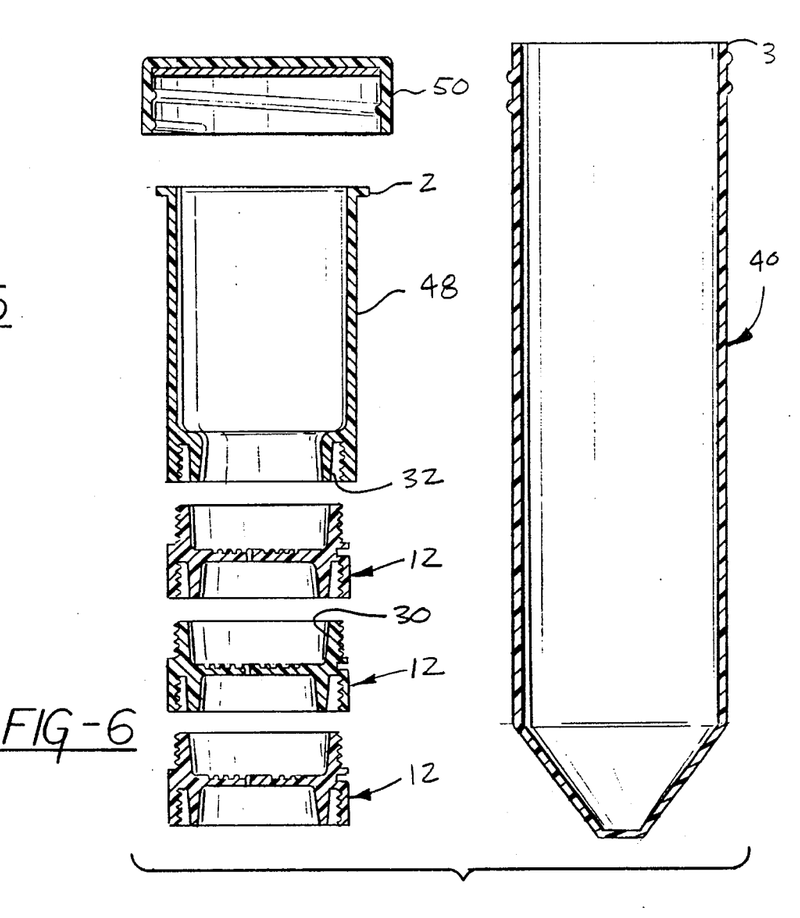
FIG. 6 is an exploded view in elevation and in section showing the same elements.
Figure 8:
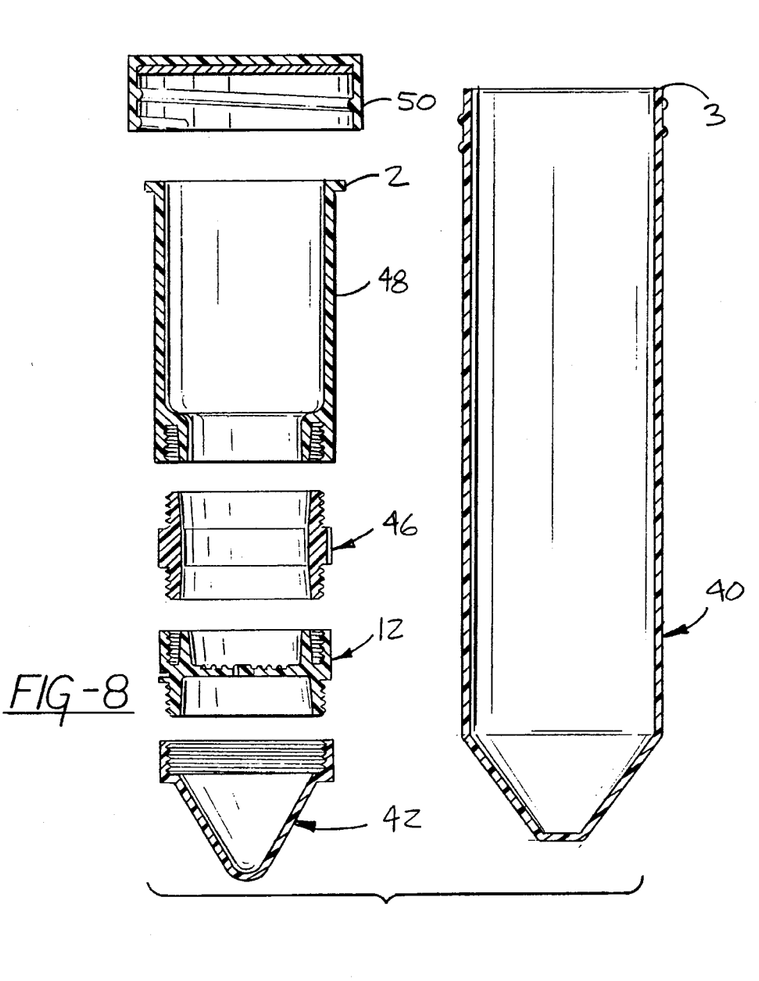
FIG. 8 is an exploded view in elevation and in section showing the same elements.

FIGS. 5 and 6 show a preferred embodiment of the invention configured as a centrifuge tube insert. The elements are shown with threaded connection structures. The elements in this example comprise three filter media modules 12, and a sample reservoir 48. The apparatus is assembled by threading together the modules and the reservoir. Threading the elements brings the male and female sealing surfaces 30 and 32 into contact and forms a leak-proof seal. The assembly is inserted into a centrifuge tube 40 so that the flange 2 of the reservoir rests on the lip 3 of the tube. The reservoir is filled with the sample fluid, a cap 50 is placed on the tube, and the assembly is spun in a centrifuge. The assembly is then disassembled and the retentate on each module or the filtrate is recovered. FIGS. 7 and 8 show a preferred embodiment for recovery of retentate from a filter media module 12. After a fluid sample has been filtered and the apparatus disassembled as described above, a recovery cup 42, is threaded onto the inlet on the module, a reversing adapter 46 is threaded to the module outlet, the assembly inverted, threaded to the sample reservoir 48, and inserted into a centrifuge tube 40. Optionally, a small amount of fluid is added to the reservoir to assist in flushing the module, the cap 50 assembled, and the assembly is spun gently to drive the retentate into the cup.

Figure 9:
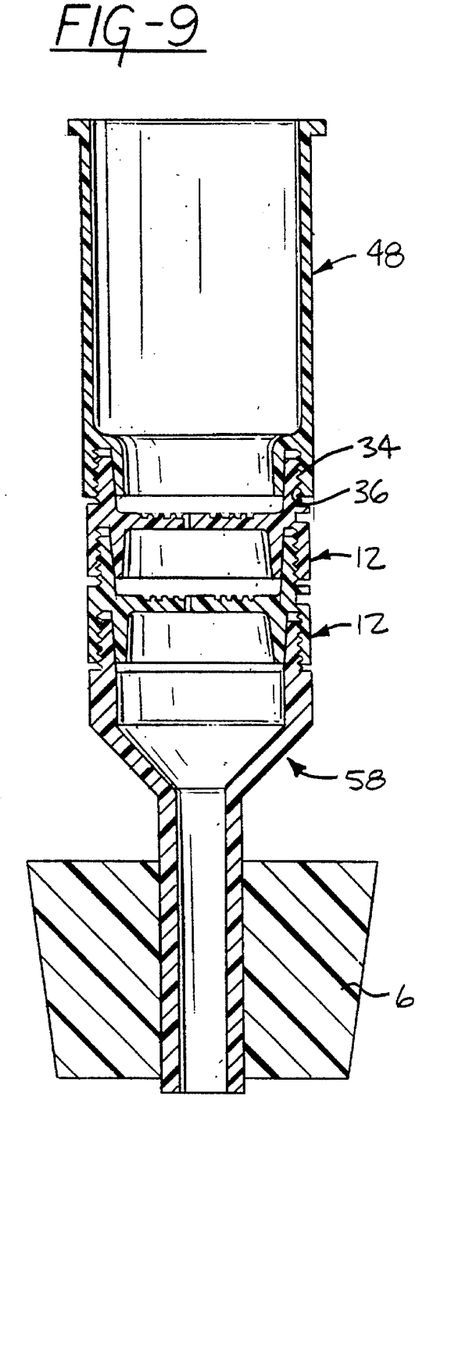
FIG. 9 is an elevational view in section of assembled elements of a filter apparatus for selective separation of materials in a manifold (negative pressure) configuration.
Figure 10:
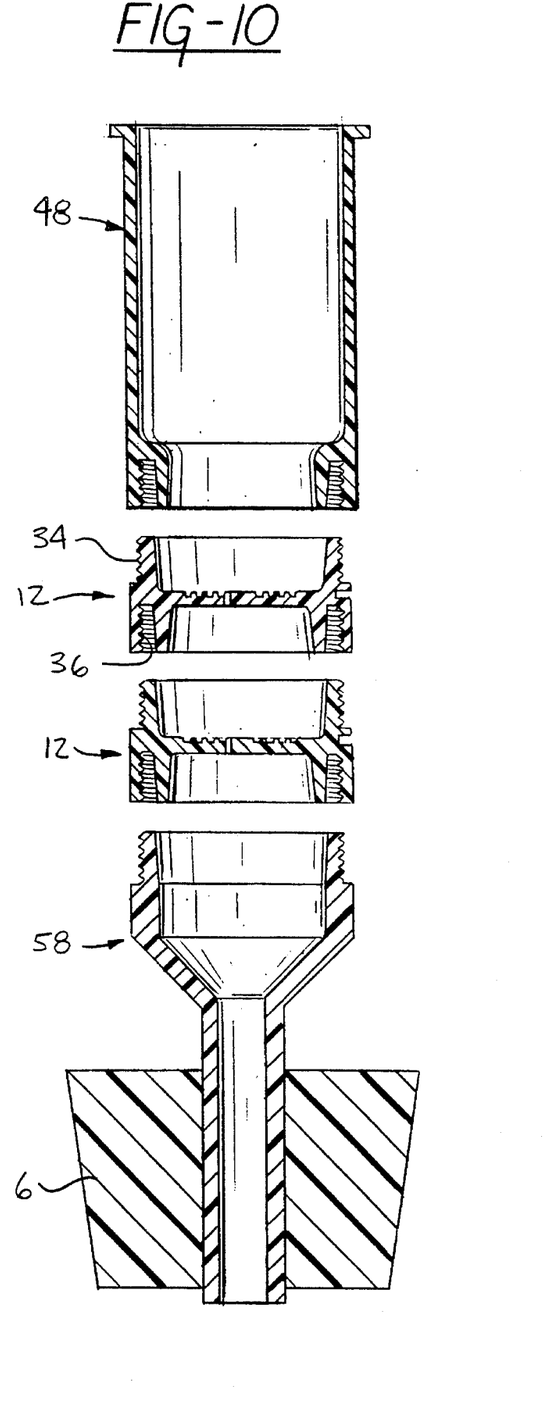
FIG. 10 is an exploded view in elevation and in section showing the same elements.

As shown in FIGS. 9 and 10, a preferred embodiment comprises selective separation apparatus in a manifold configuration, (preferred, e.g., for use with a vacuum manifold) having threaded connection structures comprising external and internal threads 34, 36, including an outlet funnel structure 58 having a funnel stem removably supported in a vacuum manifold stopper 6.

Figure 11:
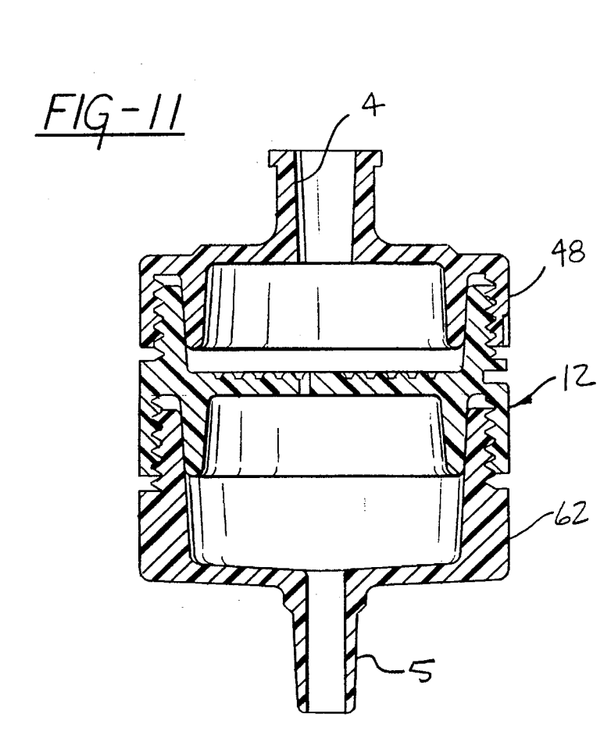
FIG. 11 is an elevational view in section of assembled elements of a filter apparatus for selective separation of materials in a syringe filter (positive pressure) configuration.
Figure 12:
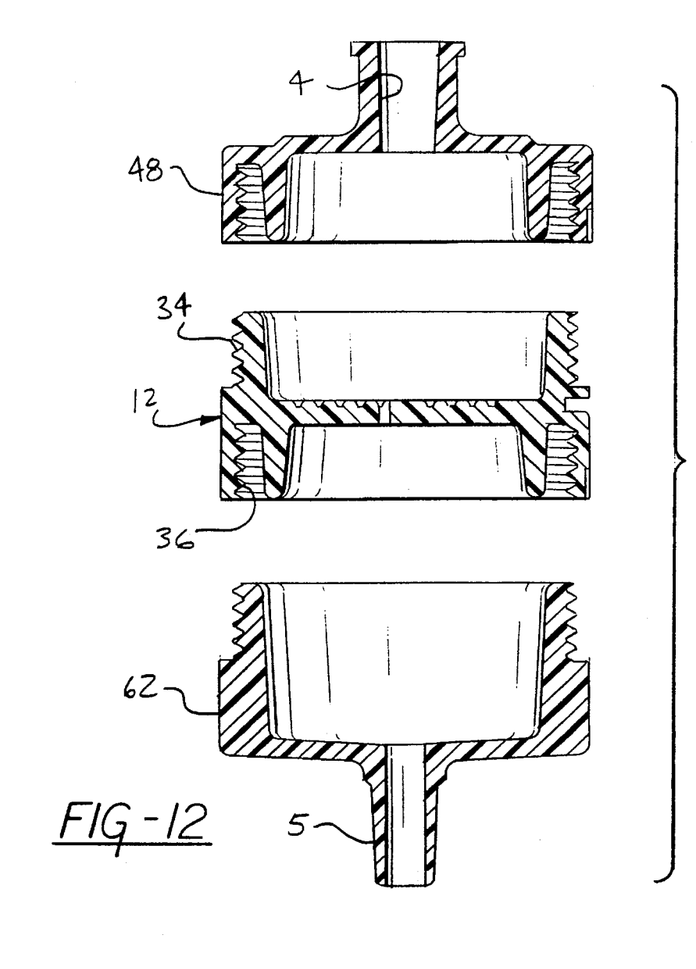
FIG. 12 is an exploded view in elevation and in section showing the same elements.
Figure 13:
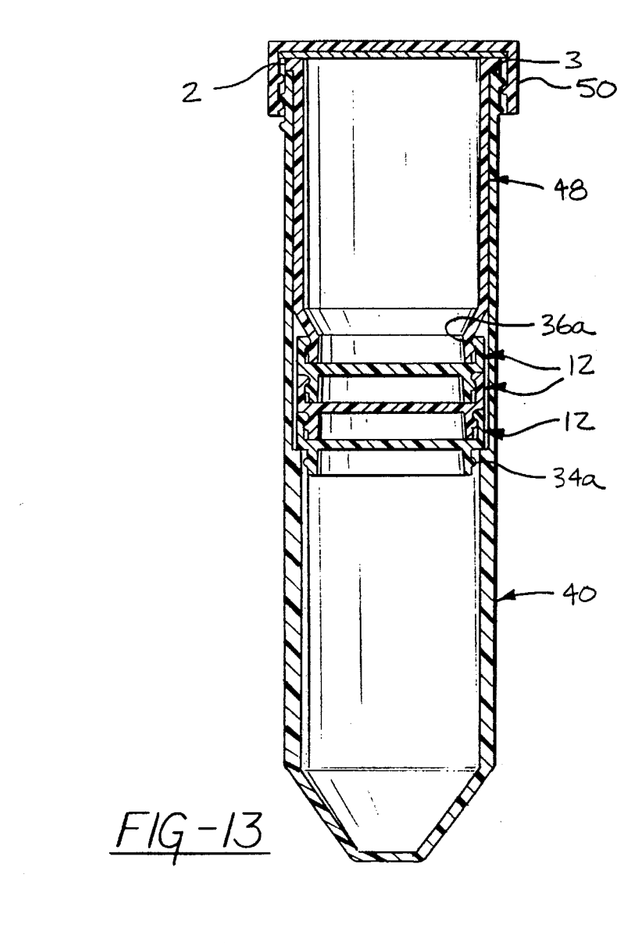
FIG. 13 is a side view in diametral section of a train of filter media modules and a sample reservoir having snap lock connections with compression fittings, assembled and inserted in a centrifuge tube, for selective separation of materials.
Figure 14:
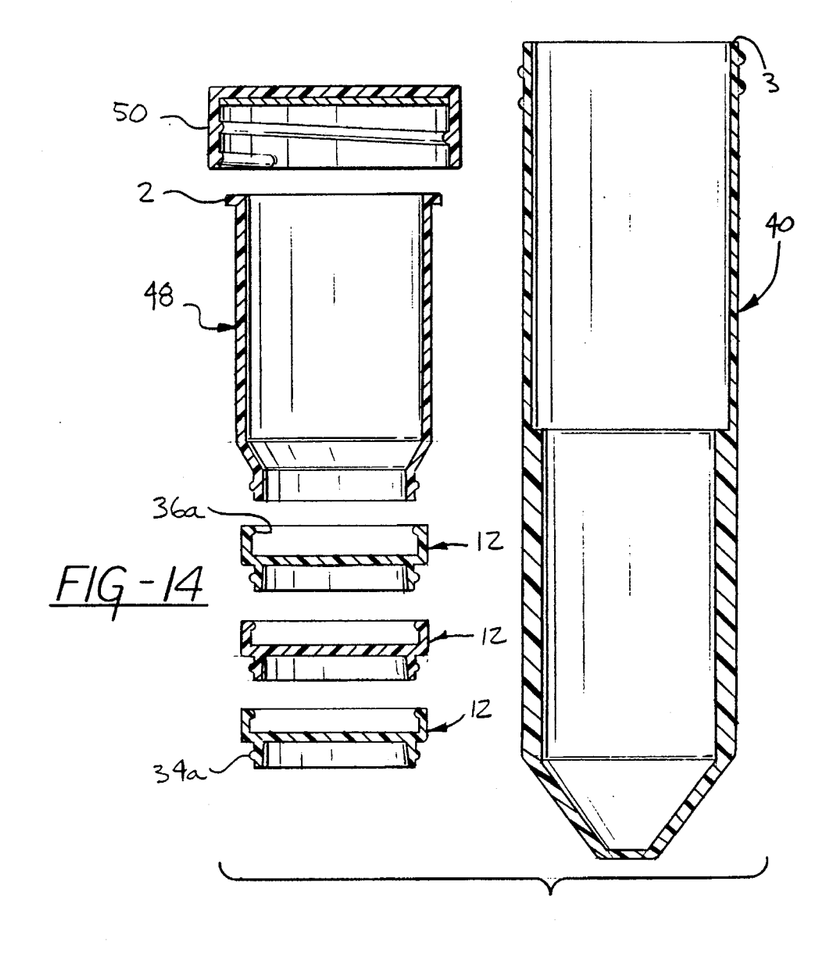
FIG. 14 is an exploded view of the same elements.
Figure 15:
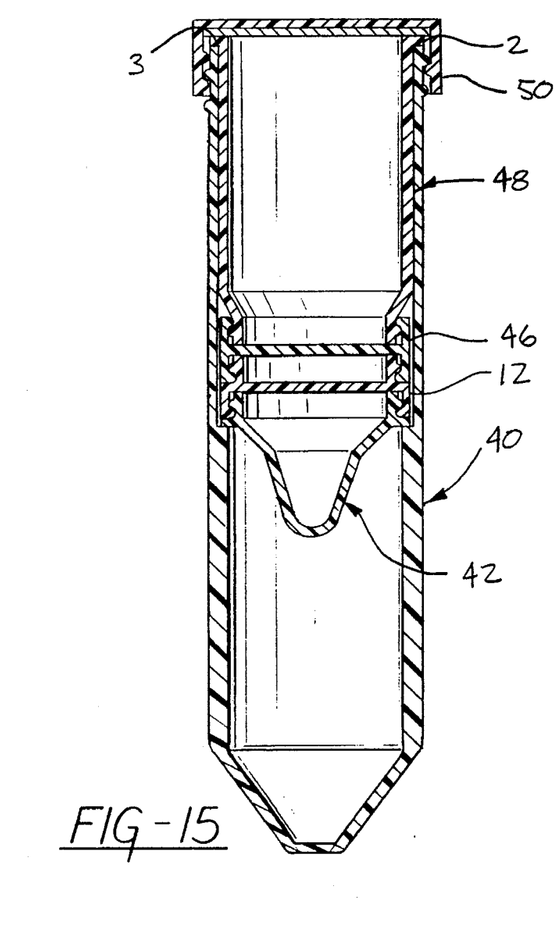
FIG. 15 is a side view in diametral section of assembled elements including a reversing adapter and a recovery cup having snap lock connection, inserted in a centrifuge tube, for rinsing and recovery of retentate.
Figure 16:
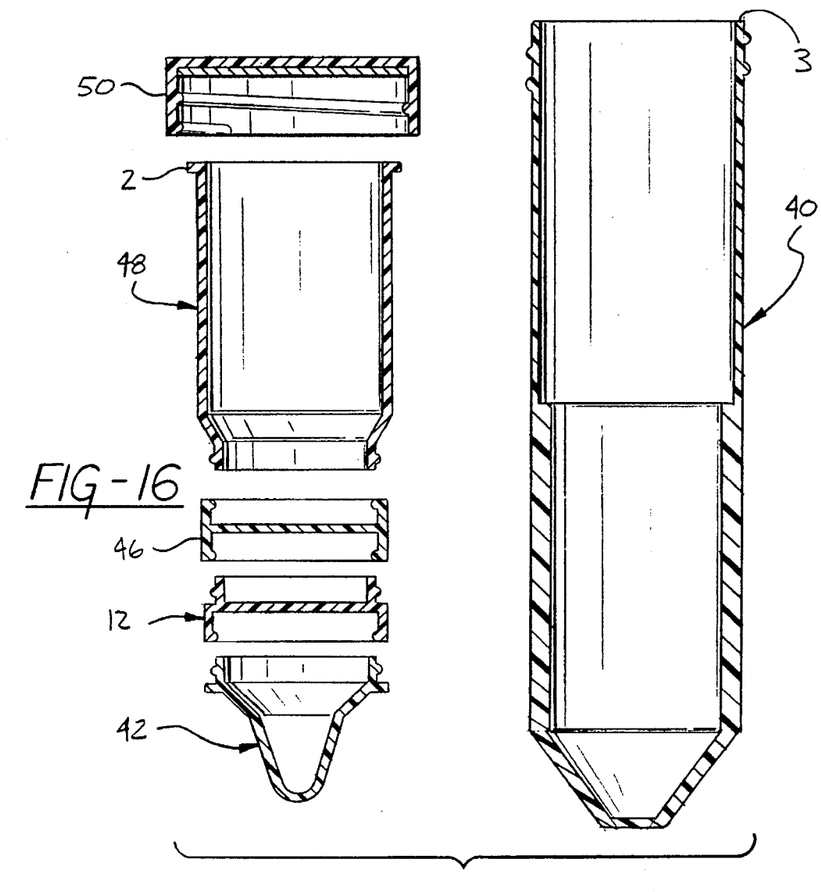
FIG. 16 is an exploded view of the same elements of FIG. 15.

As shown in FIGS. 11 and 12, a preferred embodiment comprises a selective separation apparatus in a syringe filter configuration having threaded connection structures. In this example the sample reservoir 48 takes the form of an inlet element with the open filling end configured with a female Luer lock fitting 4f or attachment to a syringe or other positive pressure device. An outlet element 62 is shown with a male slip Luer fitting 5 for optional connection to a downstream device or tubing.

As shown in FIGS. 13–16, a preferred embodiment comprises apparatus in a centrifuge insert configuration having a snap lock connection means comprising outer and inner snap locks 34a, 36a which are used and are a leak-proof functional equivalent of the thread connection means of the herein described thread-connected apparatus.

Figure 17:
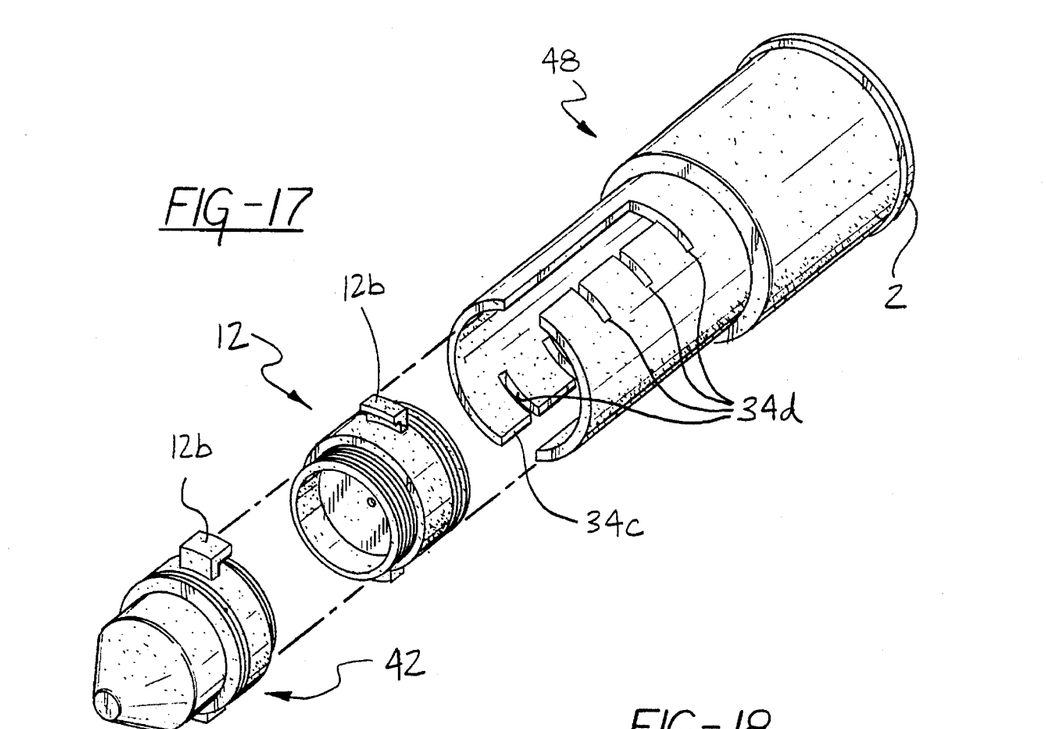
FIG. 17 is an exploded view in perspective of a selective separation device comprising as elements a sample reservoir, a reversible filter media module, and a recovery cup, each of which elements when assembled together has for connection a bayonet lock with compression fittings, shown in centrifuge tube insert configuration.

As shown in FIG. 17, a preferred embodiment comprises selective separation apparatus in a centrifuge insert configuration having a bayonet lock connection means with compression fittings, including a sample reservoir 48 with opposed bayonet insert channels 34c, opposed bayonet slide channels 34d, a reversible filter media module 12 with opposed bayonet locks 12b and a recovery cup 42 with opposed bayonet locks 12b. In use, a train of one or more filter modules 12 are assembled in the sample reservoir 48 by inserting the modules, one at a time, such that the opposed pair of bayonet locks 12b coincide with the insert channels 34c and further such that each pair of locks 12 reaches the channel end and is rotated fully into the innermost lock channel 34d to achieve a compression fit, after which the insertion and locking procedure is repeated with the next module 12. The apparatus is ready for centrifugation with a sample fluid and is carried out by the selective separation procedure described above for collection and processing of retentate and filtrate material resulting from filtration. In this configuration, the recovery cup and the module can be inverted and directly attached to the reservoir, without the need for an adapter.

Figure 18:
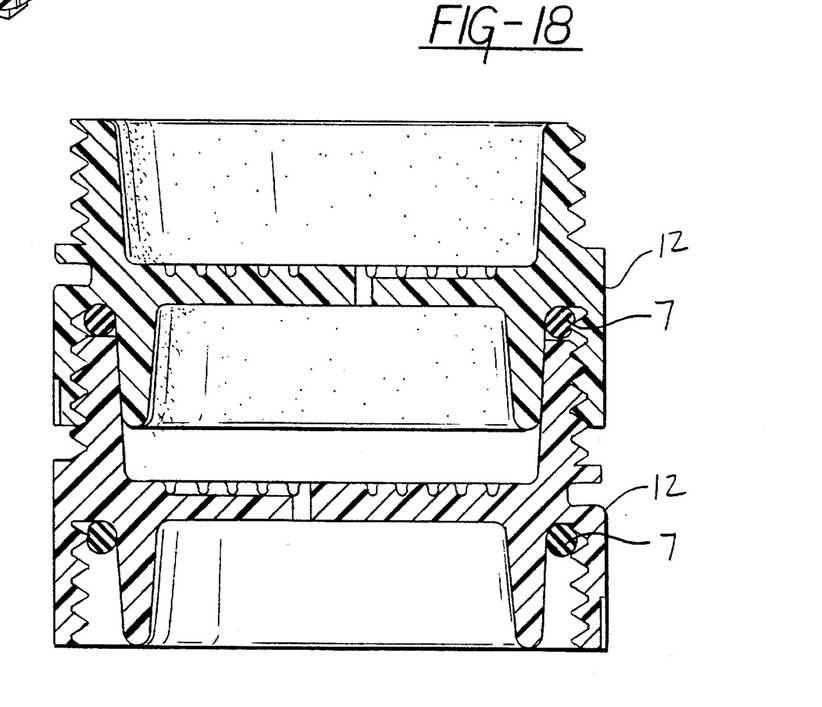
FIG. 18 is an elevational view in diametral section of assembled elements including threaded and O-ring connection structures.

FIG. 18 shows filter media modules 12 connected together by threads 34, 36 in combination with an elastomeric seal 7 (e.g., an O-ring or equivalent seal) preferably under fluid-tight compression.

It will be understood that the aforementioned discussion, description and examples are merely illustrative of particular embodiments of the present invention and are not limitations upon the practice thereof. It is the following claims, including all equivalents which define the scope of the invention.

We claim:

1. A filtration apparatus for the selective separation of materials from a fluid sample, said apparatus comprising:

at least two filter modules, each module comprising a generally cylindrical member having an inlet end with a coupling member of a first type defined thereupon, an outlet end with a coupling member of a second type defined thereupon, and a fluid flow path defined therebetween, each module further including a filter medium supported therein in said fluid flow path so that the entirety of a volume of fluid passing along said fluid flow path from said inlet end to said outlet end will pass through said filter medium, wherein each coupling member of said first type is reversibly engageable with each coupling member of the second type so that said modules may be connected together so that the outlet end of a first module will be engaged with the inlet end of a second module; and a sample reservoir comprising a generally cylindrical member having an inlet end, an outlet end and a fluid flow passage therebetween, said sample reservoir having a coupling member of said second type defined at the outlet end thereof, so that the outlet end of said sample reservoir is reversibly engageable with the inlet end of one of said at least two modules; whereby, the entirety of a volume of fluid which is introduced into the sample reservoir will pass in series through the filter medium of the first module and the filter medium of the second module.

2. A filtration apparatus as in claim 1, wherein said sample reservoir further includes a removable closure configured to be reversibly engageable with the inlet end of said sample reservoir.

3. A filtration apparatus as in claim 1, wherein said sample reservoir further includes a flange configured to support said reservoir in a centrifuge tube.

4. A filtration apparatus as in claim 1, wherein the inlet end of said sample reservoir is configured to engage a positive pressure device.

5. A filtration apparatus as in claim 1, wherein the outlet end of at least one of said at least two filter modules is configured to engage a vacuum device.

6. A filtration apparatus as in claim 1, further including a recovery cup having a cup rim which is engageable with a coupling member of the first type.

7. A filtration apparatus as in claim 1, further including a reversing adapter operable to couple the outlet end of a filter module to the outlet end of the sample reservoir.

8. A filtration apparatus as in claim 7, wherein said reversing adapter comprises a generally cylindrical member having an inlet end, an outlet end and a fluid flow passageway therebetween, said inlet end and said outlet end each having a coupling member of said first type defined thereupon.

9. A kit for the assembly of a filtration apparatus to be used for the selective separation of materials from a fluid sample, said kit including:

a plurality of filter modules, each module comprising a generally cylindrical member having an inlet end with a coupling member of a first type defined thereupon, an outlet end with a coupling member of a second type defined thereupon and a fluid flow path defined therebetween, each module further including a filter medium supported therein in said fluid flow path so that the entirety of a volume of fluid passing along said fluid flow path from said inlet end to said outlet end will pass through said filter medium, wherein each coupling member of the first type is reversibly engageable with each coupling member of the second type so that said modules may be connected together with the outlet end of a first module reversibly engaged with the inlet end of a second module so that the entirety of a volume of fluid introduced into the fluid flow path of said first module can pass in series through the filter medium of said first module, into the fluid flow path of said second module, and through the filter medium of said second module;

a sample reservoir comprising a generally cylindrical member having an inlet end, an outlet end and a fluid flow passage therebetween, said sample reservoir having a coupling member of said second type defined at the outlet end thereof so that said sample reservoir may be reversibly engaged with the inlet end of one of said filter modules;

a recovery cup having a rim which includes a coupling member of said second type defined thereupon so that said recovery cup may be reversibly engaged with the inlet end of one of said filter modules; and a reversing adapter comprising a generally cylindrical member having an inlet end, an outlet end and a fluid flow passageway therebetween, said reversing adapter having a coupling member of said first type defined at the inlet end thereof and at the outlet end thereof; whereby said reversing adapter may be reversibly engaged with the outlet end of said sample reservoir and the outlet end of said filter module.

* * * * *